United States Patent
Kore et al.

(10) Patent No.: US 9,565,575 B2
(45) Date of Patent: Feb. 7, 2017

(54) INTERFERENCE AVOIDANCE TECHNIQUE FOR WIRELESS NETWORKS USED IN CRITICAL APPLICATIONS

(71) Applicant: Honeywell International Inc., Morristown, NJ (US)

(72) Inventors: Vinayak Sadashiv Kore, Karnataka (IN); Mohammed Rizwan, Karnataka (IN); Gourango Biswas, Karnataka (IN); Andrew G. Berezowski, Wallingford, CT (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 411 days.

(21) Appl. No.: 13/951,116

(22) Filed: Jul. 25, 2013

(65) Prior Publication Data
US 2015/0029025 A1    Jan. 29, 2015

(51) Int. Cl.
*G08B 1/08*     (2006.01)
*H04W 24/02*    (2009.01)
(Continued)

(52) U.S. Cl.
CPC ............ *H04W 24/02* (2013.01); *G01S 5/0289* (2013.01); *G06Q 10/06* (2013.01); *G06Q 10/08* (2013.01);
(Continued)

(58) Field of Classification Search
CPC ....... G01S 5/0289; G06Q 10/06; G06Q 10/08; G08B 25/003; G08B 25/007; G08B 25/10; G08B 29/16; G08B 29/18; H04L 1/00; H04L 1/08; H04L 63/18; H04L 67/12; H04Q 9/00; H04Q 2209/40; H04W 12/10; H04W 24/02; H04W 4/006; H04W 84/18
See application file for complete search history.

(56) References Cited

U.S. PATENT DOCUMENTS 6,614,350 B1 *  9/2003  Lunsford ........... G08B 13/1418
                                              340/539.11
6,751,248 B1 *  6/2004  Tan ..................... H04B 7/269
                                                  370/337
(Continued)

FOREIGN PATENT DOCUMENTS

EP      2 442 287 A1    4/2012
WO   WO 2011/146319 A1  11/2011

OTHER PUBLICATIONS

European search report and European search opinion from corresponding EP application 141773432, dated Dec. 17, 2014.

*Primary Examiner* — Quang D Pham
(74) *Attorney, Agent, or Firm* — Husch Blackwell LLP

(57) ABSTRACT

An apparatus is provided that uses the steps of providing a plurality of wireless sensor devices coupled to a controller in a security system configured into a wireless network where at least one is a child sensor device that communicates with the controller through at least first and second parent sensor devices, the child sensor device measuring an environmental parameter within the secured area and transmitting a message to the controller through the at least two parents, the message is transmitted during a first time period and on a first frequency to the first parent and a copy is transmitted during a second time period and on a second frequency to the second parent wherein the first and second times and first and second frequencies are all different and wherein the first and second time periods are directly adjacent to one another in time.

20 Claims, 4 Drawing Sheets

(51) Int. Cl.
*G01S 5/02* (2010.01)
*G06Q 10/06* (2012.01)
*G06Q 10/08* (2012.01)
*H04L 29/06* (2006.01)
*H04Q 9/00* (2006.01)
*H04W 4/00* (2009.01)
*H04W 12/10* (2009.01)
*H04L 29/08* (2006.01)
*G08B 25/10* (2006.01)
*G08B 29/18* (2006.01)
*G08B 25/00* (2006.01)
*G08B 29/16* (2006.01)
*H04L 1/00* (2006.01)
*H04L 1/08* (2006.01)
*H04W 84/18* (2009.01)

(52) U.S. Cl.
CPC ........... *G08B 25/003* (2013.01); *G08B 25/007* (2013.01); *G08B 25/10* (2013.01); *G08B 29/16* (2013.01); *G08B 29/18* (2013.01); *H04L 1/00* (2013.01); *H04L 1/08* (2013.01); *H04L 63/18* (2013.01); *H04L 67/12* (2013.01); *H04Q 9/00* (2013.01); *H04W 4/006* (2013.01); *H04W 12/10* (2013.01); *H04Q 2209/40* (2013.01); *H04W 84/18* (2013.01)

(56) References Cited

U.S. PATENT DOCUMENTS

| | | | | |
|---|---|---|---|---|
| 7,289,466 | B2 | 10/2007 | Kore et al. | |
| 7,933,667 | B2 * | 4/2011 | Sjoberg | B25J 13/065 318/567 |
| 7,979,096 | B1 * | 7/2011 | Elliott | H04W 72/1278 340/539.22 |
| 8,559,464 | B2 * | 10/2013 | Caracas | H04J 3/0652 370/503 |
| 8,737,275 | B2 * | 5/2014 | Athley | H04B 7/0617 370/280 |
| 2003/0152086 | A1 * | 8/2003 | El Batt | H04W 74/0816 370/400 |
| 2005/0018631 | A1 * | 1/2005 | Sivakumar | H04B 1/713 370/329 |
| 2006/0215581 | A1 * | 9/2006 | Castagnoli | H04L 12/2602 370/254 |
| 2006/0215582 | A1 * | 9/2006 | Castagnoli | H04L 45/02 370/254 |
| 2008/0084294 | A1 | 4/2008 | Zhiying et al. | |
| 2009/0067403 | A1 * | 3/2009 | Chan | H04W 16/10 370/343 |
| 2009/0213822 | A1 * | 8/2009 | Keshavarzian | H04L 47/10 370/338 |
| 2009/0257420 | A1 | 10/2009 | Kore et al. | |
| 2010/0079278 | A1 * | 4/2010 | Suzuki | G08B 25/10 340/539.17 |
| 2010/0110888 | A1 * | 5/2010 | Park | H04W 74/0816 370/230 |
| 2010/0177684 | A1 | 7/2010 | Kore et al. | |
| 2012/0113986 | A1 * | 5/2012 | Shaffer | H04L 1/1854 370/390 |
| 2012/0117268 | A1 * | 5/2012 | Shaffer | H04L 45/24 709/238 |
| 2012/0275490 | A1 * | 11/2012 | Courtice | H04W 40/246 375/133 |
| 2013/0073852 | A1 * | 3/2013 | Oba | H04L 63/061 713/168 |
| 2013/0242905 | A1 * | 9/2013 | Rasband | H04W 56/0015 370/329 |
| 2013/0243038 | A1 * | 9/2013 | Rasband | H04W 8/005 375/133 |
| 2014/0022934 | A1 * | 1/2014 | Furukawa | H04W 24/06 370/253 |
| 2014/0213311 | A1 * | 7/2014 | Courtice | H04W 40/246 455/508 |

* cited by examiner

INTERFERENCE AVOIDANCE TECHNIQUE FOR WIRELESS NETWORKS USED IN CRITICAL APPLICATIONS

FIELD

The field relates to security systems and more particularly to wireless security systems.

BACKGROUND

Security systems are generally known. Such systems typically involve the use of one or more sensors placed in a secured area and that detect events within that area. Detected events may include anything that represents a threat to safety or security (e.g., fire, carbon monoxide, intruders, etc.).

Various combinations of sensors may be used depending upon the application. For example, a home security system typically includes one or more environmental sensor (e.g., fire, carbon monoxide, etc.) as well as one or more intrusion sensors.

Most home security systems are, in turn, coupled to a central monitoring station. Upon detection of an event, the home security system transmits a message to the central monitoring station identifying the type and location of the threat.

Recent improvements to home security systems have included the use of wireless sensors. While such sensors are reliable, they operate at a relatively low power level and are vulnerable to interference.

While the reliability of such devices could be improved by increasing the power of transmissions, such increase would only raise the interference to other devices. Accordingly, a need exists for better methods of transmitting signals within wireless home security networks.

DETAILED DESCRIPTION OF AN ILLUSTRATED EMBODIMENT

Figure 1:
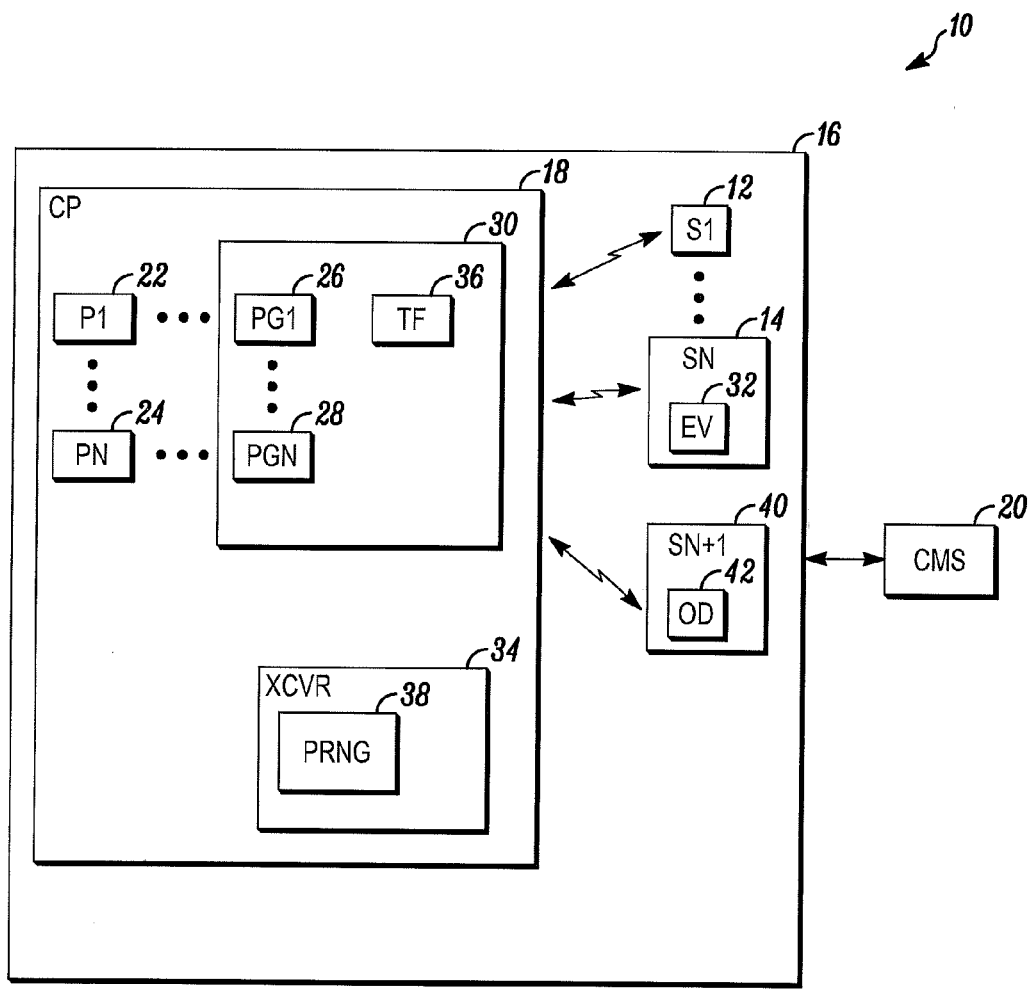
FIG. 1 depicts a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

In the context of wireless sensor devices within a security system, regulations govern the behavior of wireless transmitters in the ISM band. Those regulations require that transmitters randomly frequency hop at least once every 400 ms. Wireless security systems are required to be robust and ensure the transmission of alarm information under all circumstances. Wireless security systems are often installed in the presence of other wireless systems that act as interference sources. Also, there are many mobile sources of interference including walkie-talkies, cordless phones and RFID readers which could be brought very close to wireless security system elements. It is desirable to create a wireless system that is essentially immune to neighboring interference sources.

FIG. 1 depicts a security system 10 shown generally in accordance with an illustrated embodiment of the invention. Included within the system is a number of wireless sensor devices 12, 14, 40 (e.g., smoke, fire, intruders, etc.) used to detect threats within a secured area 16. Also included within or attached to one of the sensor devices may be an output device (e.g., audio annunciator, warning light, etc.) 42. As discussed below, each of the sensor devices may be a sensor, a repeater or an output device.

The various embodiments of the system may use various combinations of antenna diversity, data transmission redundancy, spatial diversity of transmitters and receivers in a wireless mesh, frequency diversity, and carefully selected timing to avoid the above problems. By combining these elements within the framework of governing regulatory requirements, these embodiments insure that information transfer can be completed even in the presence of interferences sources in very close proximity (on the order of 30 cm).

As shown in FIG. 1, the sensors may be coupled to a controller (e.g., a control panel) 18. Upon activation of one of the sensor devices, the control panel may send an alarm message to a central monitoring station 20. The central monitoring station may respond by summoning the police or other appropriate public service organization.

Included within the panel and each respective wireless sensor device is circuitry that provides the functionality of the system. The circuitry may include one or more processor apparatus (processors) 22, 24 operating under control of one or more computer programs 26, 28 loaded from a non-transitory computer readable medium (memory) 30. As used herein reference to a step performed by a program is also a reference to the processor that executed that step.

In general, the control circuitry of each sensor device may include an intrusion switch or environmental sensor 32 and one or more programmed processors that operate to monitor, retrieve and process environmental readings from the environmental sensor or intrusion sensor. A comparison processor within the sensor device or control panel may compare the readings with one or more threshold values. Where the readings exceed a corresponding threshold value, an alert may be generated.

The alerts either from the environmental sensor or intrusion sensors may be forwarded to an alarm processor within the control panel. The alarm processor, in turn, may compose and send an alarm message to the central monitoring station. The alarm message may include at least an identifier of the secured area (e.g., address, account number, etc.) and a location of the sensor within the secured area.

Figure 2:
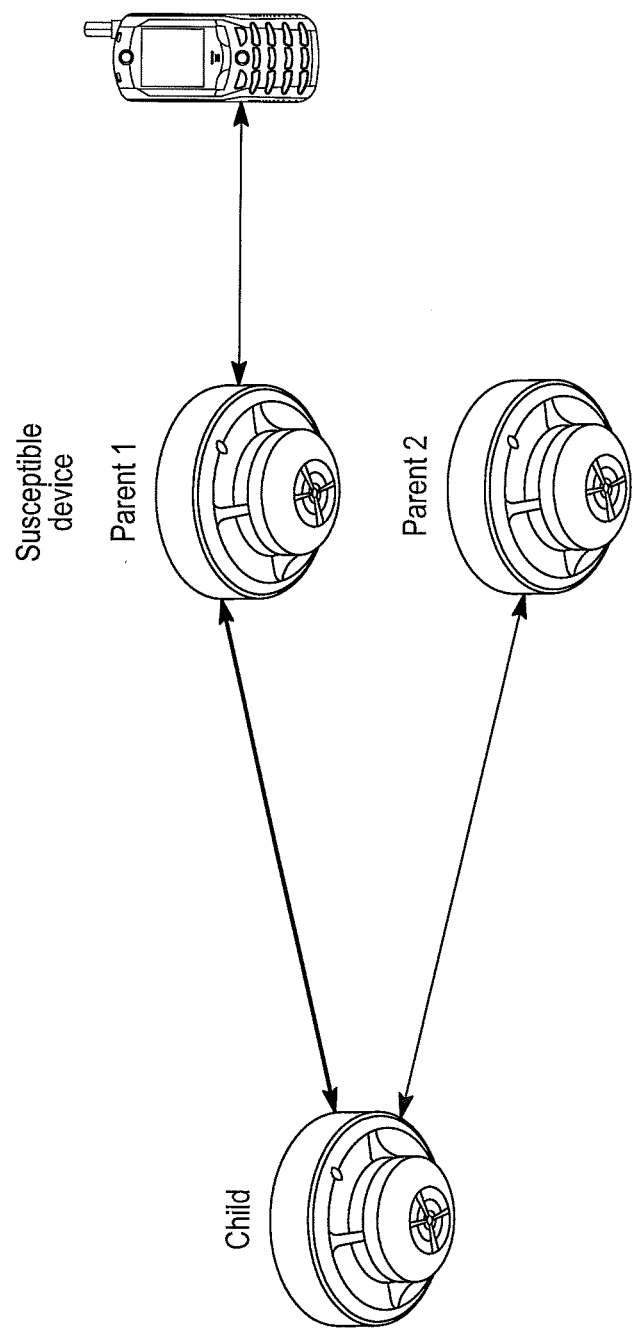
FIG. 2 depicts a communication link between a child and two parents within the system of FIG. 1 with an interferer near one of the parents.
Figure 3:
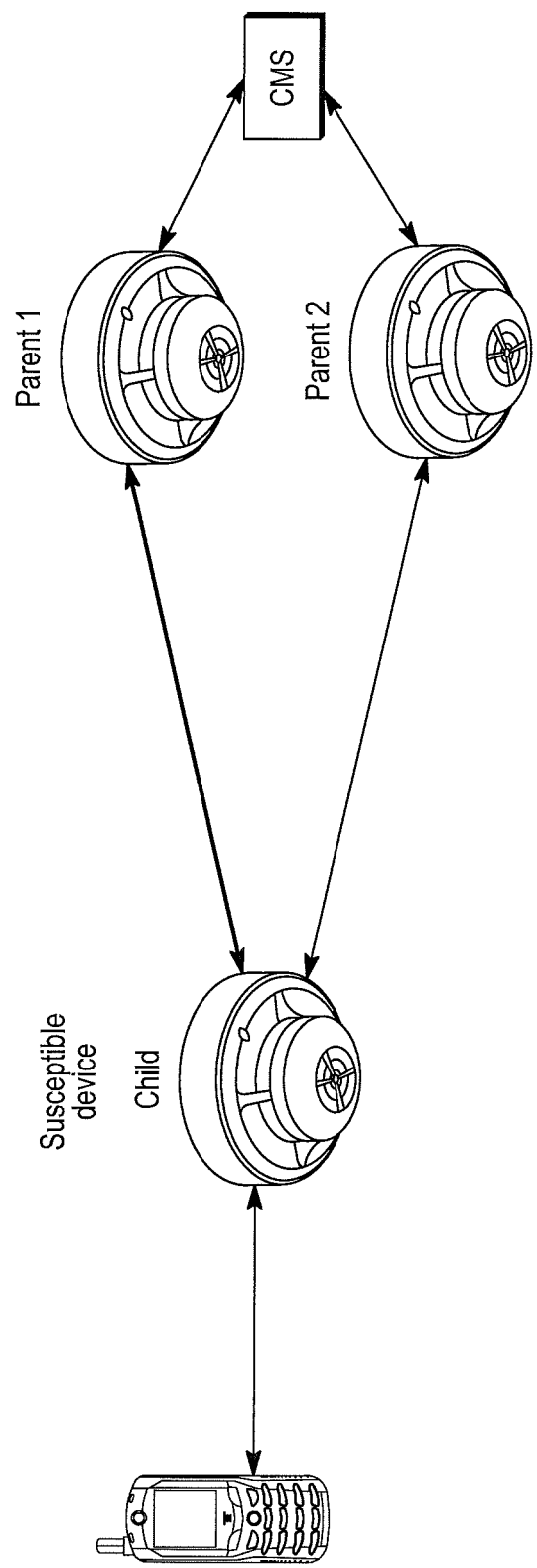
FIG. 3 depicts a communication link between a child and two parents within the system of FIG. 1 with an interferer near the child.

Upon activation of the wireless sensors, the sensors may arrange themselves into a communication system including at least one child sensor and at least two parent sensors as shown in FIG. 2. The parent sensors (e.g., primary and secondary parents), in turn, each form a respective communication connection with the central monitoring station either directly (as shown in FIG. 3) or through the alarm panel 18. For purposes of simplicity, the description below will be based upon a connection with the central monitoring station through the alarm panel.

The communication system set up within the system is based upon the availability of a wireless transceiver 34 located within the panel 18 and each of the wireless sensors. During set up of the communication system, a set up processor within each of the wireless transceivers may be programmed to cause the wireless transceiver to tune to a default frequency and transmit registration messages. The wireless transceivers may do this randomly or based upon a timing signal transmitted from the control panel. The wireless transceiver under control of a registration processor within each of the sensor devices will attempt to register with the control panel directly or through another wireless sensor. In each case, where a wireless sensor cannot register directly with the control panel, that sensor registers through at least two parent wireless sensor devices.

In this regard, each wireless sensor device may first transmit registration messages directed towards the panel for a predetermined length of time. If the panel does not respond, then the device may detect any nearby sensor devices via signal strength or some other detection mechanism. The sensor device (child device) may then select the two closest sensor devices as parent devices and attempt to register with the panel through these two devices.

In this regard, the child device seeking to register may transmit a registration message seeking registration directed specifically to the two nearby devices. The devices receive the registration messages and respond with an acknowledgement and return a set of channels available through that parent device. The registration processor within the device seeking registration compares the lists in order to find two uplink channels available within the parent devices that are directly adjacent in time and two downlink channels that are directly adjacent in time and returns an acceptance message to each parent identifying a respective channel set. The two parents accept the connection and the set up of the respective uplinks between the child and two parents is complete.

The two parents may then separately attempt to register the child with the panel. They may do this by each forwarding the registration message from the child on another uplink channel (not then in use by the respective parent for their own communications with the panel) to the panel. Once the parent has registered the child with the panel on the other uplink channel, the parent may then exchange message between the child and panel through the separate uplink and downlink channels of the parent maintained for the benefit of the child.

In general, the wireless communication system among wireless sensor devices is formed such that each child has at least two parents. Each child transmits its data twice (once to each parent). The transmissions are arranged to be directly adjacent in time, and the frequency of transmission is different for each transmission and is determined in a pseudorandom fashion by each receiver. Because these transmissions on different frequencies are immediately adjacent in time, the probability that both frequencies would be in use by a proximate interferer is very low. In addition, because the two different receivers are spatially separated, an interference source that is near one of the receivers, and using the same channel at the same time will not affect the other receiver using a different channel.

In the same wireless mesh system, data transmitted to children in the mesh is transmitted redundantly by two different parents at nearly adjacent timeslots on different frequencies pseudo-randomly assigned by each of the parents.

In both of the above approaches, the duration of the transmissions are kept as short as possible (at least an order of magnitude lower than most interfering sources). Most commercially available mobile devices operating in the same band make use of the maximum available dwell time in each frequency slot. The shorter dwell time with redundant transmitted data at different frequencies in adjacent or nearly adjacent timeslots serves to mitigate the effects of the interference sources using longer dwell times. Antenna diversity may be employed in addition, to further reduce the effects of proximate interference. When antenna diversity is employed, multiple antennas on each of the devices are selected via processing circuitry within the device to maximize the gain with respect to the desired signal and minimize gain with respect to the interference source.

As shown in FIG. 2, the presence of an interferer (e.g., a cell phone, a walkie-talkie, etc.) within a very close proximity should not affect the transmission from the child wireless device to the parent. In this regard, the mesh may operate on a time division multiplexing (TDM) mode. During set-up, a communication processor within the control panel may download a predetermined set of operating parameters from a frame set-up file 36 that define the specifics of frame operation and of the superframe within which the system will operate. The communication processor may establish the timing of the frame and superframe via signals transmitted via the transceiver within the control panel. The file may specify the number of frames in a superframe, the number of slots in each frame and the time duration of each slot in each frame.

In this regard, the frame set-up file may include a predetermined list of frequencies on which the parent and child transceivers will operate. A channel processor within each child and parent wireless sensor may cause the transceivers to use frequency hopping through the list of frequencies where the corresponding child and parent advance one frequency each frame in synchronism. Alternatively, the corresponding child and parent may use a matching pseudo-random number generator 38 within each transceiver 34 to simultaneously select the same frequency from the list during each transmission slot.

In general, the child wireless sensor may divide the assigned slot in half and use a first half of the slot to transmit a message to the first parent and the second half of the slot to transmit a copy of the message to the second parent on a different frequency. Alternatively, the child may use two successive slots to transmit to the two parents. In this way, the transmission to the second parent begins immediately after completion of the transmission to the first parent.

Similarly, each of the at least two parents transmits the message in two immediately adjacent slots or portions of slots. As shown in FIG. 3, a interference source (e.g., a cellular telephone) may operate within 12 inches of the child node without blocking the signals from either parent.

Figure 4:
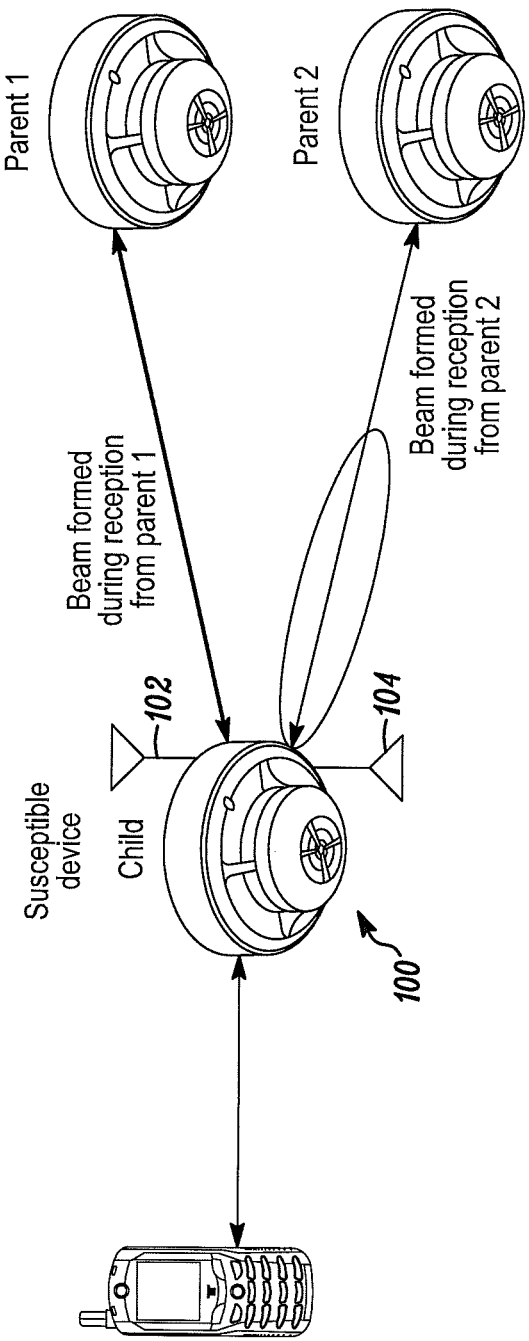
FIG. 4 depicts a communication link between a child and two parents within the system of FIG. 1 using beamforming.

In another embodiment (shown in FIG. 4) beam forming is used. In this regard, a wireless sensor 100 uses a diversity arrangement including a first antenna 102 and a second antenna 104. A signal optimization processor within the wireless sensor may select the antenna with the strongest signal from each parent or may time shift the signal from each antenna to form the strongest possible signal using beam forming.

In another embodiment, the system may use channel set shifting to reduce the impact of interference. The system of FIG. 1 is designed in such a way that it detects these interferences and intelligently moves to the extreme edges of the band to reduce the impact of the interferences.

For example, using a standard unlicensed frequency band, NCH1 and NCH2 can define a primary channel set used in the normal operation of the system of FIG. 1 where NCH1 is used for primary parent communication and NCH2 is used for secondary parent communications. When interference is detected, the system moves to a secondary channel set including WCH1 for primary parent communication and WCH2 for secondary parent communication. Since WCH1 and WCH2 are located on the extremes of the band, they are less impacted by interferences. As WCH1 and WCH2 are not simultaneously impacted by the interference operating anywhere in the band, the system level impact is reduced extensively. The system devices thus operating at the band edge sample the primary channel set (NCH1 and NCH2) at certain periodicity during their idle times to check if the interference is still present. If the interference is confirmed to be absent, the devices coordinate to move back to the primary channel set together.

In order to implement channel shift, the primary parent normally listens in the primary channel set (NCH1) and the secondary parent listens in the secondary channel set (NCH2) in the absence of interference. Upon detection of interference (in the NCH1 and NCH2 channel sets), the primary and secondary parents sequentially or simultaneously move to the edges of the band (WCH1 and WCH2). In this mode, the primary parent listens both on the primary as well as secondary channel sets for messages from child nodes. Similarly, the secondary parent also listens in the primary as well as the secondary channel sets for messages from the child nodes. Devices that are trying to join the network always first try to join the network in the primary channel set and, if they can't discover the network, move to the secondary channel set. Due to this additional redundancy, the impact of interference on the system is minimized.

In general, the system performs a set of steps including providing a plurality of wireless sensor devices coupled to a controller in a security system, the plurality of wireless sensor devices configured into a wireless network that protects a secured area where at least one of the wireless sensor devices further comprise a child sensor device that communicates with the controller through at least first and second parent sensor devices, the child sensor device measuring an environmental parameter within the secured area and the child sensor device transmitting a message including at least the measured environmental parameter to the controller through each of the at least two parents, the message is transmitted during a first time period and on a first frequency to the first parent and a copy of the message is transmitted during a second time period and on a second frequency to the second parent wherein the first and second time periods and first and second frequencies are all different and wherein the first and second time periods are directly adjacent to one another in time.

In another embodiment, the system includes a plurality of wireless sensor devices coupled to a controller in a security system, the plurality of wireless sensor devices configured into a wireless network that protects a secured area where at least one of the wireless sensor devices further comprise a child sensor device that communicate with the controller through at least first and second parent sensor devices, an environmental sensor of the child sensor device measuring an environmental parameter within the secured area and a transmitter of the child sensor device transmitting a message including at least the measured environmental parameter to the controller through each of the at least two parents, the message is transmitted during a first time period and on a first frequency to the first parent and a copy of the message is transmitted during a second time period and on a second frequency to the second parent wherein the first and second time periods and first and second frequencies are all different and wherein the first and second time periods are directly adjacent to one another in time and wherein the transmission to the second parent begins immediately after completing the transmission to the first parent.

In still another embodiment, the system includes a plurality of wireless sensor devices coupled to a controller in a security system, the plurality of wireless sensor devices configured into a wireless network that protects a secured area where at least one of the wireless sensor devices further comprise a child sensor device that communicate with the controller through at least first and second parent sensor devices, an environmental sensor of the child sensor device measuring an environmental parameter within the secured area and a transceiver of the child sensor device transmitting a message including at least the measured environmental parameter with the controller through each of the at least two parents and receiving a message from the central monitoring station through each of the at least two parents, the message transmitted by the child device is transmitted during a first time period and on a first frequency to the first parent and a copy of the message is transmitted during a second time period and on a second frequency to the second parent and the message received by the child device is received during a third time period and on a third frequency from the first parent and a copy of the message is received during a fourth time period and on a fourth frequency from the second parent wherein the first, second, third and fourth time periods are no-overlapping and the first, second, third and fourth frequencies are all different from an adjacent in time frequency and wherein the first and second time periods are directly adjacent to one another in time and third and fourth time periods are directly adjacent to one another in time and wherein the transmission to and reception from the second parent begins immediately after completing the transmission to and reception from the first parent.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method for transmitting a message from a wireless sensor device among a plurality of wireless sensor devices configured in a wireless network in a security system, the method comprising:
providing the plurality of wireless sensor devices coupled to a control panel of the security system, the plurality of wireless sensor devices configured into the wireless network that protects a secured area, wherein at least one wireless sensor device of the plurality of wireless sensor devices being a child sensor device that communicates with the control panel through at least first and second parent sensor devices, wherein each of the plurality of wireless sensor devices further comprises a sensor, a repeater or an output device; the child sensor device measuring an environmental parameter within the secured area; and
the child sensor device transmitting the message including at least the measured environmental parameter to the control panel through each of the at least first and second parent sensor devices, wherein the message is transmitted using a first channel during a first time period and on a first frequency to the first parent sensor device and a copy of the message is transmitted using a second channel during a second time period and on a second frequency to the second parent sensor device, wherein the first and second time periods and the first and second frequencies are all different, the second time period begins immediately after a conclusion of the first time period;

wherein the first channel and the second channel are selected by a registration processor of the child sensor device during a registration process, to include the child sensor device in the wireless network, based on a respective set of channels available of the first and second parent sensor devices for the child sensor device to communicate with the control panel through the first and second parent sensor devices.

2. The method as in claim 1 further comprising the child sensor device using frequency hopping for transmission of the message and the copy of the message to the control panel through the first and second parent sensor devices.

3. The method as in claim 1 further comprising the child sensor device using time division multiplexing for transmission of the message and the copy of the message to the control panel through the first and second parent sensor devices.

4. The method as in claim 1 further comprising the control panel transmitting a second message to the child sensor device through each of the first and second parent sensor devices, the second message from the control panel is transmitted during a third time period and on a third frequency to the child sensor device through the first parent sensor device and a copy of the second message is transmitted during a fourth time period and on a fourth frequency to the child sensor device through the second parent sensor device, wherein the third and fourth time periods and the third and fourth frequencies are all different, and wherein the third and fourth time periods are directly adjacent to one another in time.

5. The method as in claim 4 further comprising the second parent sensor device beginning the transmission of the copy of second message to the child sensor device immediately after the first parent sensor device completes the transmission of the second message to the child sensor device.

6. The method as in claim 4 further comprising the first and second parent sensor devices using frequency hopping for transmission of the second message and the copy of the second message from the control panel to the child sensor device.

7. The method as in claim 1 further comprising the at least first and second parent sensor devices monitoring for interference on a primary channel set including the first frequency during the first time period and the second frequency during the second time period.

8. The method as in claim 7 further comprising at least one of the first and second parent sensor devices detecting interference on the primary channel set and moving to a secondary channel set.

9. The method as in claim 8 wherein the secondary channel set further comprises extreme edges of a corresponding frequency band.

10. The method as in claim 9 further comprising the first and second parent sensor devices monitoring the primary and secondary channel sets for interference.

11. The method as in claim 4 further comprising at least one of the first and second parent sensor devices beamforming the second message to the child sensor device.

12. An apparatus for transmitting a message from a wireless sensor device among a plurality of wireless sensor devices configured in a wireless network in a security system, the apparatus comprising:

a plurality of wireless sensor devices coupled to a control panel of the security system, the plurality of wireless sensor devices configured into the wireless network that protects a secured area, wherein at least one wireless sensor device of the plurality of wireless sensor devices being a child sensor device that communicates with the control panel through at least first and second parent sensor devices;

an environmental sensor of the child sensor device measuring an environmental parameter within the secured area; and a transmitter of the child sensor device transmitting the message including at least the measured environmental parameter to the control panel through each of the at least first and second parent sensor devices, wherein the message is transmitted using a first channel during a first time period and on a first frequency to the first parent sensor device and a copy of the message is transmitted using a second channel during a second time period and on a second frequency to the second parent sensor device, wherein the first and second time periods and the first and second frequencies are all different, wherein the first and second time periods are directly adjacent to one another in time, and wherein transmission to the second parent sensor device begins immediately after completing transmission to the first parent sensor device; and wherein the first channel and the second channel are selected by a registration processor of the child sensor device during a registration process, to include the child sensor device in the wireless network, based on a respective set of channels available of the first and second parent sensor devices for the child sensor device to communicate with the control panel through the first and second parent sensor devices.

13. The apparatus as in claim 12 further comprising a processor of the child sensor device that uses frequency hopping for transmission of the message and the copy of the message to the control panel through the first and second parent sensor devices.

14. The apparatus as in claim 12 further comprising a processor of the child sensor device that uses frequency hopping and time division multiplexing for transmission of the message and the copy of the message to the control panel through the first and second parent sensor devices.

15. The apparatus as in claim 12 further comprising at least one of the first and second parent sensor devices receiving the message through at least two different antennas associated with the respective first and second parent sensor devices using beamforming.

16. An apparatus for transmitting a message from a wireless sensor device among a plurality of wireless sensor devices configured in a wireless network in a security system, the apparatus comprising:

a plurality of wireless sensor devices coupled to a control panel of the security system, the plurality of wireless sensor devices configured into the wireless network that protects a secured area, wherein at least one wireless sensor device of the wireless sensor devices being a child sensor device that communicates with the control panel through at least first and second parent sensor devices;

an environmental sensor of the child sensor device measuring an environmental parameter within the secured area; and a transceiver of the child sensor device transmitting a first message including at least the measured environmental parameter to the control panel through each of the at least first and second parent sensor devices and receiving a second message from the control panel through each of the at least first and second parent sensor devices, the first message is transmitted by the child sensor device using a first channel during a first time period and on a first frequency to the first parent sensor device, a copy of the first message is transmitted by the child sensor device using a second channel during a second time period and on a second frequency to the second parent sensor device, the second message is received by the child sensor device using a third channel during a third time period and on a third frequency from the first parent sensor device, and a copy of the second message is received by the child sensor device using a fourth channel during a fourth time period and on a fourth frequency from the second parent sensor device, wherein the first, second, third and fourth time periods are non-overlapping and the first, second, third and fourth frequencies are all different from an adjacent frequency, wherein the first and second time periods are directly adjacent to one another in time and the third and fourth time periods are directly adjacent to one another in time, and wherein transmission to and reception from the second parent sensor device begins immediately after completing transmission to and reception from the first parent sensor device, and wherein the first channel and the second channel are selected by a registration processor of the child sensor device during a registration process, to include the child sensor device in the wireless network, based on a respective set of channels available of the first and second parent sensor devices for the child sensor device to communicate with the control panel through the first and second parent sensor devices.

17. The apparatus as in claim 16 wherein the first and second parent devices further comprise diversity antenna.

18. The apparatus as in claim 16 further comprising a processor of the child sensor device that beam forms the message and the copy of the message to the first and second parent devices.

19. The apparatus as in claim 16 further comprising the child sensor device and the first and second parent sensor devices using frequency hopping for transmission of the first and second messages between the control panel and the child sensor device.

20. The apparatus as in claim 16 further comprising the child sensor device and the first and second parent sensor devices simultaneously moving to an edge of a frequency band upon detecting interference.

\* \* \* \* \*